United States Patent Office 3,087,875
Patented Apr. 30, 1963

3,087,875
GRAFT COPOLYMERS
Roger K. Graham, Merchantville, N.J., and La Verne N. Bauer, Cheltenham, and Muriel S. Gluckman, Pittsburgh, Pa., assignors to Rohm & Haas Company, Philadelphia, Pa., a corporation of Delaware
No Drawing. Filed May 8, 1958, Ser. No. 733,823
12 Claims. (Cl. 204—154)

This invention concerns novel graft copolymers as new compositions of matter. It further relates to a method for the preparation of these graft copolymers.

The present invention deals with graft copolymers in which specific monomers are grafted onto particular preformed polymers by means of high energy irradiation. The monomers and polymers used in this invention are known compounds. Although graft polymerization may occur with these under conventional polymerization conditions, the extent of grafting is often limited or even non-existent. Under such conditions any graft polymer which is formed will be highly contaminated by homopolymer. In contrast, by employing the teachings of this invention, there are obtained unique graft copolymers in substantially quantitative amounts.

The polymer reactants employed are soluble, thermoplastic, substantially linear poly(alkyl methacrylate), in which the alkyl portion contains from three to about eighteen carbon atoms, preferably no more than twelve carbon atoms. It is preferred within the alkyl representation to employ groups that exhibit branching rather than straight chain configurations particularly in the lower members of the series. While the alkyl portion may exhibit any of the known spatial configurations, including cyclic and acyclic structures, it is preferred to use those alkyl groups having a primary or secondary, that is non-tertiary, carbon atom attached directly to the adjacent oxygen atom. It is quite satisfactory for tertiary carbon atoms to be present in the alkyl group, but it is preferred that a tertiary carbon atom is not joined directly to the oxygen atom to which the alkyl group is attached. It is critical that the poly(alkyl methacrylate) contain at least three carbon atoms in the alkyl portion since for reasons not entirely understood, repeated attempts to effect graft copolymerization with poly(alkyl methacrylate), wherein the alkyl portion contains one or two carbon atoms, have uniformly failed. Successful graft copolymerization, according to the teachings of this invention, start where the alkyl group has at least three carbon atoms and when the alkyl group contains just three carbon atoms, it is preferred that it be in the iso configuration.

The polymer reactant employed serves as the backbone of the subject graft copolymers, that is, it is the chain onto which the monomer reactant is grafted. It is the critical cooperative reaction between the specific polymer and monomer reactants of this invention that, under the present reaction conditions to be explained hereinafter, produces the unexpectedly advantageous results of this invention. The polymer reactant must be one of the defined poly(alkyl methacrylates) in order for the desired results to be obtained.

Typical of the soluble thermoplastic, linear polymers that may be employed include those that are made from alkyl methacrylates such as isopropyl methacrylate, butyl methacrylate, cyclopentyl methacrylate, hexyl methacrylate, cyclohexyl methacrylate, 2-ethylhexyl methacrylate, octyl methacrylate, 2,2,4-trimethylhexyl methacrylate, decyl methacrylate, isodecyl methacrylate, dodecyl methacrylate, tetradecyl methacrylate, octadecyl methacrylate and mixtures, which of course give copolymers of two or more thereof.

The polymer reactants of this invention may have molecular weights in the range of about 1,000 to 5,000,000, preferably 100,000 to 1,000,000. These molecular weights refer to number average values.

The monomer reactant is grafted onto the polymer molecule, as stated previously, under the initiation of high energy irradiation, to be more fully discussed hereinafter. The monomer reactant is restricted as to identity, since not all monomers capable of polymerization according to conventional free radical methods can be used in the present graft copolymerization. The present monomers preferably should wet and swell the polymer molecule and the polymer molecule preferably should be or become soluble in the monomer in order that a compatible system is obtained for highest grafting efficiency. If the solubility characteristics of the solid combination of polymer molecule and monomer are not entirely satisfactory for maximum effects, then there may be employed a solvent. The compound employed should be a solvent for both the polymer molecule and the monomer. There may be employed as a solvent preferably an aromatic compound such as benzene, toluene, xylene, or the like. Other solvents that may be employed include aliphatic hydrocarbons, such as pentane, hexane, octane, isooctane, and cyclohexane; ethers, such as diethyl ether, ethyl butyl ether, dibutyl ether, and dioxane; and halogenated hydrocarbons such as carbon tetrachloride and chloroform. Other solvents may be employed, such as esters, alcohols, and ketones, but some may lower the efficiency of grafting.

In most instances, it is preferable to select polymer and monomer reactants so that a compatible system is achieved without the necessity of introducing a solvent, since in some situations, some solvents may adversely affect the grafting efficiency. However, in some situations, such as when a poly(dodecyl methacrylate) and N-vinylpyrrolidinone system is used, it is preferred to employ benzene as a solvent wherein excellent grafting efficiency is consistently observed. The necessity or desirability of a solvent will be clear to one skilled in the art.

There may be used as monomer reactants, alkyl acrylates and thioacrylates in which the alkyl portion contains from one to eighteen carbon atoms, preferably no more than about twelve carbon atoms; alkyl methacrylates and thiomethacrylates in which the alkyl portion contains from one to eighteen carbon atoms, preferably about no more than twelve carbon atoms; acrylonitrile; methacrylonitrile; acrylic acid; methacrylic acid; hydroxysubstituted alkyl vinyl ethers in which one or two hydroxy groups may be attached to an alkylene chain of two to eighteen carbon atoms and in which no hydroxy group is closer to ether oxygen than two carbon atoms, and in which, if there are two hydroxy groups, such groups are on different carbon atoms; alkanamidoalkyl vinyl ethers in which the nonvinyl portion contains from three to twenty-three carbon atoms; vinyl alkyl sulfides in which the alkyl portion contains no more than eighteen carbon atoms and in which portion there may be one or two hydroxy substituents provided no hydroxy substituent is nearer to the sulfur atom than two carbons and if two hydroxy substituents are present they are on different carbon atoms; dialkylaminoalkyl vinyl sulfides in which the dialkyl portion attached to the amino nitrogen considered individually may contain up to about eight carbon atoms and considered collectively may form a five- to six-membered heterocyclic amino group with the amino nitrogen atom, and in which the nitrogen atom is always tertiary and is connected to the sulfur atom by means of an alkylene group containing from two to eighteen carbon atoms; N-vinyl lactams and alkyl substituted N-vinyl lactams preferably containing from six to twenty carbon atoms; alkyl vinyl sulfones in which the alkyl portion contains up to about eighteen carbon atoms; N-vinylalkyleneureas containing from five to twelve carbon atoms; and N-vinyl N'-aminoalkylalkyleneureas containing from seven to twenty carbon atoms. In the above monomers, the alkyl groups may exhibit any possible spatial configurations such as normal, iso, or tertiary. These alkyl groups may be acyclic or cyclic, including alkyl substituted cyclic, as long as the total carbon content conforms to the defined amount. In the hydroxy substituted compounds the hydroxy group or groups may be attached at any possible location as long as the previous definition is adhered to.

Typical of the monomer reactants that may be employed are methyl acrylate, isopropyl acrylate, cyclopentyl acrylate, 2-ethylhexyl acrylate, decyl acrylate, decyl thioacrylate, dodecyl acrylate, octadecyl acrylate, methyl methacrylate, tert-butyl methacrylate, cyclohexyl methacrylate, octyl methacrylate, octyl thiomethacrylate, undecylmethacrylate, octadecyl methacrylate, acrylonitrile, methacrylonitrile, acrylic acid, methacrylic acid, hydroxyethyl vinyl ether, hydroxyoctyl vinyl ether, dihydroxydodecyl vinyl ether, formamidoethyl vinyl ether, butanamidodecyl vinyl ether, acetamidooctadecyl vinyl ether, butyl vinyl sulfide, hydroxybutyl vinyl sulfide, octyl vinyl sulfide, octadecyl vinyl sulfide, dimethylaminoethyl vinyl sulfide, diethylaminodecyl vinyl sulfide, morpholinopentyl vinyl sulfide, pyrrolidinyloctyl vinyl sulfide, piperidinodecyl vinyl sulfide, N-vinyl-2-pyrrolidinone, N-vinyl-5-methyl-2-pyrrolidinone, N-vinyl-4,4-diethyl-2-pyrrolidinone, N-vinyl-4-butyl-5-octyl-2-pyrrolidinone, N-vinyl-6-methyl-2-piperidone, N-vinyl-6-octyl-2-piperidone. N-vinyl-2,2,6,6-tetramethyl-4-piperidone, N-vinyl-2-oxohexamethylenimine, N-vinyl-5,5-dimethyl-2-oxohexamethylenimine, N-vinyl-4-butyl-5-octyl-2 - oxohexamethylenimine, methyl vinyl sulfone, isobutyl vinyl sulfone, tert-octyl vinyl sulfone, dodecyl vinyl sulfone, octadecyl vinyl sulfone, N-vinylethyleneurea, N-vinyltrimethyleneurea, N-vinyl-1,2-propyleneurea, N-vinylbutyleneurea, N-vinyl-N'-aminoethyleneurea, and N-vinyl-N'-dibutylaminododecylethyleneurea.

It is preferred to employ pure monomers when possible. It is also desirable to employ a single monomer although mixtures of them may be used if desired. The presence of small amounts of inhibitors in commercially available monomers, while not desirable since the efficiency of graft copolymerization may be slightly decreased, is not especially objectionable. If feasible, particularly from an economic viewpoint, the monomer is desirably purified, especially if a high purity product is required.

The monomer reactants are grafted onto the polymer molecule and, thereby, form side chains that have molecular weights in the range of at least 1,000, usually considerably higher even up to 1,000,000 and over. Grafted chains of this magnitude are not possible by prior methods and such chains contribute to the unique structure and advantageous properties of the present graft copolymers.

The polymers and monomers of this invention may be reacted in a wide range of proportions. It is generally the best practice to employ at least 2% by weight of either the polymer and monomer and, of course, no more than 98% of the other. More practical ranges are at least 20% of one and no more than 80% of the other, with a range of 35 to 65% of one and 65 to 35% of the other preferred. It is relatively immaterial whether the monomer or polymer predominates in the reaction system and graft copolymer product, although, of course, some gradation of properties is observable. It is recommended that no less than about 2% of the backbone or polymer reactant be employed, since in amounts appreciably less than that, a competing homopolymerization reaction tends to complicate and minimize the benefits of the instant graft copolymerization. Correspondingly, if appreciably more than 98% of the polymer is used it tends to suffer from degradation and, possibly, other undesirable reactions which alter the characteristics of the product. Although the present graft copolymerization does occur appreciably outside of the broadest component range defined, other competing reactions tend to predominate and substantially curtail the benefits of this invention. Therefore, such excluded proportions of reactants should be avoided. All proportions of reactants within the defined ranges, set forth above, produce valuable products of this invention.

The present graft copolymerization is initiated by high energy irradiation. Suitable as sources of high energy irradiation are radioactive materials and electron accelerators. Useful as radioactive materials that supply gamma rays are irradiated isotopes such as $Co^{60}$, fission products such as $Cs^{137}$, adjuncts to fission reactions such as radioactive xenon, and the like. A $Co^{60}$ source is particularly effective. Useful as radioactive materials that supply beta rays are $Sr^{90}$ and the like. Valuable as electron accelerators, which supply beta rays, are the Van de Graaff generator, the resonant transformer, and the like. These electron accelerators as sources of high energy irradiation are growing in importance because of availability and economic advantages. Nevertheless, either radioactive materials or electron accelerators may be used with substantially equal success.

The important consideration involving the use of high energy irradiation is the amount or quantity to which the polymer monomer system is exposed. The irradiation quantity or dose is a product of intensity and time and is conveniently measured in reps (Roentgen-equivalent-physical). A rep is equivalent to the ionization produced by the absorption of 93 ergs of energy per gram of irradiated substance. The quantities or dosages useful in the present instance range from 10,000 to 10,000,000 reps, with 500,000 to 2,000,000 reps preferred. Actually the range of dosages is limited on the lower side only by the lowest practical measurable amount, which is at about 10,000 reps. At this figure the conversion is not very high, but nonetheless, a graft copolymerization of this invention occurs in appreciable amounts. The range of dosages is limited on the higher side by the necessity of obviating undesirable degradation of the polymer backbone or cross-linking of the graft copolymer product. These undesirable effects usually do not occur until the dosage exceeds considerably 10,000,000 reps although, of course, the exact figures will vary somewhat with the particular polymer and monomer system. A consistently practical efficient range of dosages is 500,000 to 2,000,000 reps, and such is, therefore, preferred.

The sources of high energy irradiation produce gamma and/or beta rays as indicated in amounts known or capable of calculation. One then selects a desired dosage and by knowing the strength of the source can determine the time of exposure. For instance, if a source irradiates energy at the rate of 150,000 reps per hour and a dosage of 1,500,000 reps is desired, the polymer-monomer systems is irradiated for 10 hours. Similarly, for a source calibrated at 250,000 reps per hour and a desired dosage of 125,000 reps, the time of irradiation is one-half hour.

By employing the polymers and monomers of this invention under the conditions of irradiation just discussed it is possible to produce valuable graft copolymers in a way unknown heretofore. These results are surprising since the monomers alone under the initiation of high energy irradiation homopolymerize quite readily. For some reason not clearly understood, the monomers of this invention in the presence of the instant polymers prefer to attach themselves to the preformed polymer molecule when initiated by the method of this invention, to form the unique graft copolymers of this invention.

The graft copolymerization may be continued on a practical basis in the range of about −70° to 100° C., with 0° to 70° C. preferred. Temperatures greater than 100° C. may be employed but appreciably higher values may lead to the hindrance or predominance of reactions other than the desired one. Within the temperature ranges set forth above, which are the practical ones, the present reaction may be conducted, if desired, at temperatures above the lower of the glass points of the polymer reactant and the copolymerization product, although this is not a critical factor, but preferably below the temperature at which thermal homopolymerization of the monomer predominates.

The glass temperature or apparent second order transition temperature is that temperature at which the first derivative of thermodynamic variables, such as coefficient of expansion, specific volume, or heat capacity, undergoes a sudden change. This transition temperature is observed as an inflection temperature which is conveniently found by plotting the log of the modulus of rigidity against temperature. A suitable method for determining such modulus and transition temperature is described by Williamson in British Plastics 23, 87–90.

In the present case, the polymer reactant has one transition temperature and the copolymer product generally exhibits two transition tmperatures. These two transition temperatures are generally somwhat lower than the transition temperatures found for the corresponding component as a homopolymer. It is frequently desirable to employ graft copolymerizing operating temperatures that are somewhat above the lower of the two glass temperatures of the graft copolymer product and these glass temperatures, as a first approximation, may be determined from the glass temperatures of the corresponding homopolymers. It is often preferred, when practical and not otherwise limited, to conduct the instant reaction above the higher of the two transition or glass temperatures of the graft copolymer product. However, the present copolymerization is effectively consummated at or below the lowest of the glass temperatures concerned, which is surprising in the light of the conduct of the corresponding poly (alkyl acrylate) backbone wherein very little, if any, reaction occurs at such temperatures.

The glass or transition temperatures, of course, vary from system to system, depending on the particular polymers and monomers employed, but these temperatures have specific values that are known or readily determined by known methods. For instance, there has been recently reported pertinent glass temperatures by Rogers and Mandelkern in Journal of Physical Chemistry 61, 985 (1957).

The temperature at which thermal homopolymerization of the monomer predominates is that temperature at which the monomers of this invention apparently preferentially undergo homopolymerization rather than the desired graft copolymerization. Therefore, in order to obtain adavntageous results in the present instances, the reacting temperature should be maintained at a point no higher than just below the point at which appreciable thermal homopolymerization occurs. The point at and above which thermal homopolymerization is favored is generally known or readily determined by known methods for the monomers of this invention.

Anaerobic conditions, that is the absence of oxygen, are preferred in the present method. While the instant reaction progresses in the presence or absence of oxygen, it is preferred substantially to eliminate any contact between oxygen and the reaction system because sometimes with oxygen present there develop some complexities not entirely desirable.

The graft copolymer products of this invention are stable, white, translucent to opaque resins that are tough, durable, and of high impact strength. Surprisingly, these resin products exhibit torsional modulus constancy over appreciable temperature ranges, which makes them available for a wide range of novel applications. This torsional modulus constancy is demonstrated by the fact that over a considerable temperature range between the two glass temperatures of the graft copolymers these products have good form stability plus high impact strength. An ordinary copolymer would possess either characteristic, but not both, and would exhibit a sharp transition at a point intermediate the two glass temperatures.

The subject resins may be molded, cast and extruded into toys, automobile accessories, advertising signs, and the like. They may also be used as coatings for wood, metal, leather, and the like, in which applications they exhibit marked superiority over mixed polymers. Normally, when the use of polymers for coatings is contemplated, a mixture of polymers, containing a blend of desired properties, is employed and applied from a prepared solution. Usually, however, the polymers stratify on drying, thus minimizing and generally eliminating any possible benefits from the combination of the polymers with the desired properties. Here, since a homogeneous product is concerned, there can be no deterrent stratification.

By the present method, it is possible, by selecting a desired concomitance of properties, to graft a soft monomer onto a hard polymer, or a hard monomer onto a soft polymer, or a monomer with a specific desired property onto a polymer with a similar or a different desired property to obtain a stable resin that contains desired modified properties in a way not possible heretofore.

Many of the present graft copolymers are useful as oil additives for increasing the viscosity, for improving the viscosity index, and for lowering the pour point of wax-containing lubricating oils and other petroleum products such as fuel oils and diesel fuels. Many of the instant products form valuable high melting fibers that may be dyed, particularly when the monomer reactant is acrylonitrile. The present resins are useful as protective coatings for metal, leather, wood, and the like, wherein they are generally applied from solutions in conventional ways.

The products of this invention are novel, stable resins that are produced in high yields. By the present method, desirable soluble products are obtained that are formed by graft copolymerization, with substantially no cross-linking, in a way previously unknown. Because of the high yields, there is frequently no need for purifying the product. If such as desire, selective solvents may be employed such as acetonitrile, diethyl ether, benzene, and the like. Identification of the products as graft copolymers may be substantiated by known selective solvent methods.

The graft copolymers of this invention, as well as the method for their preparation, may be more fully understood from the following examples that are offered by way of illustration and not by way of limitation. Parts by weight are used throughout.

*Example 1*

Poly(cyclohexyl methacrylate) of high molecular weight is prepared by polymerization in chloroform at 60° C. using benzoyl peroxide as initiator. The polymer is precipitated with methanol, washed thoroughly and dried in vacuo at 60° C. for several days to remove all solvent. To an ampoule is charged 9.5 parts of this polymer. The ampoule is evacuated to a pressure of $10^{-6}$ millimeters of mercury, and degassed methyl methacrylate monomer (8.0 parts) is distilled into the ampoule, which is then frozen and sealed under vacuum. The polymer is allowed to dissolve in the monomer at 10° C., under which conditions no polymerization occurs. The sample is then exposed to $10^6$ reps of radiation from a cobalt-60 source at 23° C. The sample is found to be completely converted to polymer, the polymer being completely soluble in chloroform, a solvent for both components. The polymer mixture is extracted with ether, a solvent only for cyclohexyl methacrylate homopolymer, and then with acetonitrile, a solvent only for methyl methacrylate homopolymer. The remaining polymer, a graft copolymer of methyl methacrylate polymer to cyclohexyl methacrylate polymer is comprised of 2.66 parts of poly (cyclohexyl methacrylate) to which was grafted 1.75 parts of poly(methyl methacrylate).

Example 2

Under similar conditions as Example 1, poly(methyl methacrylate) is used as the pre-formed polymer. This pre-formed polymer is prepared with 0.23 weight percent of ethylene glycol dimethacrylate as cross-linker, and has been subsequently treated to remove all soluble polymer and all unreacted pendant vinylidene groups.

This lightly cross-linked, insoluble polymer (4.7 parts) is swollen with 5.3 parts of degassed methyl methacrylate monomer, and the mixture submitted to a total dose of $1.0 \times 10^6$ reps of identical ionizing radiation. The sample is found to be completely converted to polymer, and 6.2 parts of soluble poly(methyl methacrylate) is extracted from the mixture by repeated extractions with ethylene dichloride. Thus none of the new polymer becomes chemically attached to the pre-formed poly(methyl methacrylate), while some of the original cross-linked polymer becomes solubilized by this treatment.

Example 3

To 10.4 parts of poly(isopropyl methacrylate) is added 9.6 parts methyl methacrylic monomer. The polymer is allowed to dissolve and the mixture is then thoroughly flushed with nitrogen to remove oxygen. The mixture is given 2.5 megareps of irradiation from a cobalt-60 source whose temperature is 40°±2° C. Extraction of the mixture, which has been completely polymerized, with diethyl ether, a solvent for only the isopropyl methacrylate homopolymer, shows that 2.9 parts of the poly(isopropyl methacylate) has become chemically attached to the poly(methyl methacrylate) formed during the polymerization.

In a similar manner, poly(isopropyl methacrylate) is dissolved in an excess of acrylonitrile monomer to give a solution containing approximately twenty percent polymer. This system is subjected to 0.25 megarep of irradiation from the same cobalt-60 source. The monomer is not completely converted to polymer, but a swollen, insoluble mass is formed inside the ampoule. This polymer dissolves slowly in dimethylformamide. The polymer is precipitated in a mixture of methanol and water. It is extracted with ether, which removes ungrafted poly(isopropyl methacrylate), the rest having become chemically joined to the polyacrylonitrile formed by the irradiation.

Example 4

Poly(butyl methacrylate) (10 parts) is allowed to dissolve in 10 parts of methyl acrylate monomer containing 0.01% hydroquinone. After the polymer dissolves, the viscous syrup is poured into a test tube which is flushed thoroughly with nitrogen and stoppered tightly. Exposure of this mixture to 2.0 megareps of gamma radiation at a temperature of 25° C. produces a polymer which is soft, rubbery and not completely soluble in any of the common organic solvents. Extraction with acetonitrile, followed by extraction with ether removes the homopolymers. A portion of the remaining material is soluble in benzene. Poly(methyl acrylate) (8.2 parts) is grafted to 3.2 parts of the original poly(butyl methacrylate).

When under similar conditions, poly(methyl methacrylate) is the pre-formed polymer and butyl acrylate the monomer, complete conversion of the monomer to polymer also occurs. The butyl acrylate becomes gelled, but all of the poly(methyl methacrylate) is removed by extraction with acetonitrile, showing that none of the poly(methyl methacrylate) has become chemically attached to the poly(butyl acrylate).

In a similar manner, when equal weights of poly(butyl methacrylate) and methacrylonitrile are irradiated to a total dose of 2.0 megareps of gamma irradiation at room temperature, a hard polymer is formed. Extraction with ether removes only a portion of the poly(butyl methacrylate). When poly(methyl methacrylate) and methacrylonitrile are irradiated in an equivalent manner, essentially all of the poly(methyl methacrylate) can be extracted with xylene.

Example 5

Poly(butyl methacrylate) is dissolved in methyl methacrylate monomer to give a solution containing fifty weight percent polymer. This mixture is exposed to 5.0 megareps of gamma irradiation. After a short induction period, the mixture is completely converted to polymer. By extraction with ether and acetonitrile to remove homopolymers, it is found that nine percent of the methyl methacrylate has become chemically attached to 37 percent of the poly(butyl methacrylate). This polymer exhibits higher impact strength than methyl methacrylate homopolymer over the temperature range 25°–85° C.

Similarly, graft copolymers are formed in good yields when methyl methacrylate or ethyl methacrylate monomer is used to dissolve poly(octadecyl) methacrylate, poly(hexyl methacrylate) and poly(heptyl methacrylate).

Example 6

Poly(2-ethylhexyl methacrylate) is mixed with twice its weight of ethyl methacrylate monomer and the mixture is irradiated in a stoppered tube. The dose used is 1.0 megarep; the temperature 70° C.±5° C. The mixture is completely converted to polymer. Analysis of a portion using acetonitrile at 45° C. and ether at 0° C. as solvents for the homopolymers shows that 25 percent of the poly(ethyl methacrylate) has become chemically grafted to the poly(2-ethylhexyl methacrylate). The remainder of the material is cast as a film from chloroform. The film is tough yet flexible from −30° to +60° C.

In a similar manner, graft copolymer results when poly(2-ethylhexyl methacrylate) is replaced by poly(isoamyl methacrylate), poly(2-heptyl methacrylate) or poly(2-octyl methacrylate).

When poly(2-ethylhexyl methacrylate) is allowed to dissolve in an equivalent amount of butyl vinyl sulfide, and the mixture is exposed to 0.75 megarep of irradiation from a gamma source at room temperature, some of the butyl vinyl sulfide is converted to polymer. Similarly, a graft copolymer is formed when butyl vinyl sulfide is replaced by methyl vinyl sulfone, hydroxyethyl vinyl ether, or formamidoethyl vinyl ether (in these cases, a common solvent, such as benzene, is used, as the monomer and polymer are incompatible).

In like manner, graft copolymers are prepared from poly(butyl methacrylate) and N-vinylethyleneurea, poly(cyclopentyl methacrylate) and N-vinyl-N'-aminoethylethyleneurea, and poly(decyl methacrylate) and acrylic acid.

Example 7

A mixture of 40 parts poly(octadecyl methacrylate) and 60 parts methyl methacrylate are irradiated to a total dose of 2.0 megareps from a cobalt-60 source at 40° C. to insure complete solubility of the polymer in the monomer. Extraction of the poly(octadecyl methacrylate) with hexane and of the poly(methyl methacrylate) with acetonitrile left a polymer in which 15 percent of the poly(methyl methacrylate) has become grafted to 27 percent of the poly(octadecyl methacrylate). At room temperature, this polymer has a slightly waxy feeling, yet is far less brittle than either of the homopolymers. Between 40° and 90° C., the polymer is flexible, non-tacky and fairly tough.

A similar treatment is given to a mixture of poly(lauryl methacrylate) and isopropyl methacrylate monomer. This polymer is tough, non-sticky and flexible when cast into a film, and exhibits these properties over the temperature range −10° to +65° C.

Example 8

A copolymer is prepared from 80 parts octyl methacrylate and 20 parts methyl methacrylate. To 20 parts of this polymer is added 80 parts isobornyl methacrylate, and the mixture shaken at room temperature until soluble. The solution is thoroughly flushed with nitrogen, and the mixture poured into a poly(vinyl alcohol) bag which is then clamped off. Irradiation of this mixture, placed in a glass tube to prevent breakage, with 7 megareps of high-energy irradiation from a cobalt-60 source held at 50° C. produces a translucent polymer which is less brittle than the homopolymer of isobornyl methacrylate, but which is form-stable at the temperature of boiling water.

A similar monomer-polymer mixture is placed in a poly(vinyl alcohol) bag formed in such a shape that the bag is no more than one inch thick. Exposure of this bag to 2 megareps of irradiation delivered at a dose rate of 6.4 megareps/hour from a Van de Graaff generator formed polymer. The conversion to polymer is high.

Example 9

To 100.1 parts of a benzene solution containing 38% of poly(dodecyl methacrylate), there is added a solution of 4.3 parts of N-vinylpyrrolidinone in 36.5 parts of benzene. There is then taken 80.7 parts of the resulting solution which is added to an ampoule. The ampoule is cooled down with liquid nitrogen, and evacuated to $10^{-5}$ mm. of mercury, and sealed off. The benzene solution of N-vinylpyrrolidinone and poly(dodecyl methacrylate), at a temperature of 30° C., is irradiated by a cobalt-60 source to a dose of $2 \times 10^6$ reps over a period of 11 hours, 46 minutes. The product is found to be a graft copolymer of 97.89% poly(dodecyl methacrylate) backbone which has 2.11% poly(N-vinylpyrrolidinone) grafted thereto.

We claim:
1. A method for the prepartion of a graft copolymer in the substantial absence of oxygen of a poly(alkyl methacrylate), in which the alkyl portion contains from three to eighteen carbon atoms, and a monomer from the class consisting of alkyl acrylates and thioacrylates in which the alkyl portion contains from one to eighteen carbon atoms, alkyl methacrylates and thiomethacrylates in which the alkyl portion contains from one to eighteen carbon atoms, acrylonitrile, methacrylonitrile, acrylic acid, methacrylic acid, hydroxy-substituted alkyl vinyl ethers in which the alkyl portion contains from two to eighteen carbon atoms and in which there are one to two hydroxy groups on said alkyl portion but never more than one hydroxy group on any one carbon atom and no hydroxy group is closer than two carbon atoms to the ether oxygen, alkanamidoalkyl vinyl ethers in which the non-vinyl portion contains from three to twenty-three carbon atoms, vinyl alkyl sulfides in which the alkyl portion contains no more than eighteen carbon atoms, hydroxy-substituted alkyl vinyl sulfides in which the alkyl portion contains from two to eighteen carbon atoms and in which there are one to two hydroxy groups on said alkyl portion but never more than one hydroxy group on any one carbon atom and no hydroxy group is closer than two carbon atoms to the sulfur atom, dialkylaminoalkyl vinyl sulfides in which the dialkyl portion considered individually contains up to about eight carbon atoms and collectively forms a five- to six-membered heterocyclic amino group with the amino nitrogen atom and in which said amino nitrogen atom is connected to the sulfur atom by means of an alkylene group of two to eighteen carbon atoms, N-vinyl lactams and alkyl-substituted N-vinyl lactams containing from six to twenty carbon atoms, alkyl vinyl sulfones in which the alkyl portion contains no more than eighteen carbon atoms, N-vinylalkyleneureas containing from five to twelve carbon atoms, and N-vinyl-N'-aminoalkylalkyleneureas containing from seven to twenty carbon atoms, which comprises graft copolymerizing substantially simultaneously 2 to 98% by weight of said poly(alkyl methacrylate) and 98 to 2% by weight of said monomer by exposure to 10,000 to 10,000,000 reps of high-energy ionizing radiation at a temperature range of about −70° to 100° C., in which said poly(alkyl methacrylate) has a molecular weight of 1000 to 5,000,000 and in which said monomer forms a side chain graft having a molecular weight of at least 1000.

2. A method according to claim 1 in which said poly(alkyl methacrylate) and said monomer are copolymerized by exposure to about 500,000 to 2,000,000 reps of high-energy ionizing radiation at a temperature range of about 0° to 70° C., in which said poly(alkyl methacrylate) has a molecular weight of 1,000 to 5,000,000 and in which the monomer forms a side chain graft having a molecular weight of at least 1,000.

3. A method for the preparation of a graft copolymer in the substantial absence of oxygen of 2 to 98% by weight of a poly(alkyl methacrylate), in which the alkyl portion contains from three to eighteen carbon atoms and 98 to 2% by weight of an alkyl methacrylate in which the alkyl portion contains from one to eighteen carbon atoms, which comprises graft copolymerizing said poly(alkyl methacrylate) and said alkyl methacrylate by exposure to 10,000 to 10,000,000 reps of high-energy ionizing radiation at a temperature range of −70° to 100° C., in which said poly(alkyl methacrylate) has a molecular weight of 1,000 to 5,000,000 and in which the monomer forms a side chain graft having a molecular weight of at least 1,000.

4. A method for the preparation of a graft copolymer in the substantial absence of oxygen of 2 to 98% by weight of a poly(alkyl methacrylate), in which the alkyl portion contains from three to eighteen carbon atoms and 98 to 2% by weight of an alkyl acrylate in which the alkyl portion contains from one to eighteen carbon atoms, which comprises graft copolymerizing said poly(alkyl methacrylate) and said alkyl acrylate by exposure to 10,000 to 10,000,000 reps of high-energy ionizing radiation at a temperature range of −70° to 100° C., in which said poly(alkyl methacrylate) has a molecular weight of 1,000 to 5,000,000 and in which the monomer forms a side chain graft having a molecular weight of at least 1,000.

5. A method for the preparation of a graft copolymer in the substantial absence of oxygen of 2 to 98% by weight of a poly(alkyl methacrylate), in which the alkyl portion contains from three to eighteen carbon atoms and 98 to 2% by weight of an N-vinyl lactam containing from six to twenty carbon atoms, which comprises graft copolymerizing said poly(alkyl methacrylate) and said N-vinyl lactam by exposure to 10,000 to 10,000,000 reps of high-energy ionizing radiation at a temperature range of −70° to 100° C., in which said poly(alkyl methacrylate) has a molecular weight of 1,000 to 5,000,000 and in which the monomer forms a side chain graft having a molecular weight of at least 1,000.

6. A method for the preparation of a graft copolymer in the substantial absence of oxygen of 2 to 98% by weight of a poly(alkyl methacrylate), in which the alkyl portion contains from three to eighteen carbon atoms and 98 to 2% by weight of a vinyl alkyl sulfide in which the alkyl portion contains no more than eighteen carbon atoms, which comprises graft copolymerizing said poly(alkyl methacrylate) and said vinyl alkyl sulfide by exposure to 10,000 to 10,000,000 reps of high-energy ionizing radiation at a temperature range of −70° to 100° C., in which said poly(alkyl methacrylate) has a molecular weight of 1,000 to 5,000,000 and in which the monomer forms a side chain graft having a molecular weight of at least 1,000.

7. A method for the preparation of a graft copolymer in the substantial absence of oxygen of 2 to 98% by weight of a poly(alkyl methacrylate), in which the alkyl portion contains from three to eighteen carbon atoms and 98 to 2% by weight of an N-vinylalkyleneurea containing five to twelve carbon atoms, which comprises graft copolymerizing said poly(alkyl methacrylate) and said N-vinylalkyleneurea by exposure to 10,000 to 10,000,000 reps of high-energy ionizing radiation at a temperature range of −70° to 100° C., in which said poly(alkyl methacrylate) has a molecular weight of 1,000 to 5,000,000 and in which the monomer forms a side chain graft having a molecular weight of at least 1,000.

8. A method for the preparation of a graft copolymer in the substantial absence of oxygen of 2 to 98% by weight of poly(dodecyl methacrylate) and 98 to 2% by weight of N-vinylpyrrolidinone, which comprises graft copolymerizing said poly(dodecyl methacrylate) and said N-vinylpyrrolidinone by exposure to 10,000 to 10,000,000 reps of high-energy ionizing radiation at a temperature range of 0° to 70° C., in which said polymethacrylate has a molecular weight of 1,000 to 5,000,000 and the monomer forms a side chain graft having a molecular weight of 1,000 to 1,000,000.

9. A method for the preparation of a graft copolymer in the substantial absence of oxygen of 2 to 98% by weight of poly(isopropyl methacrylate) and 98 to 2% by weight of methyl methacrylate, which comprises graft copolymerizing said poly(isopropyl methacrylate) and said methyl methacrylate by exposure to 10,000 to 10,000,000 reps of high-energy ionizing radiation at a temperature range of 0° to 70° C., in which said polymethacrylate has a molecular weight of 1,000 to 5,000,000 and the monomer forms a side chain graft having a molecular weight of 1,000 to 1,000,000.

10. A method for the preparation of a graft copolymer in the substantial absence of oxygen of 2 to 98% by weight of poly(butyl methacrylate) and 98 to 2% by weight of methyl acrylate, which comprises graft copolymerizing said poly(butyl methacrylate) and said methyl acrylate by exposure to 10,000 to 10,000,000 reps of high-energy ionizing radiation at a temperature range of 0° to 70° C., in which said polymethacrylate has a molecular weight of 1,000 to 5,000,000 and the monomer forms a side chain graft having a molecular weight of 1,000 to 1,000,000.

11. A method for the preparation of a graft copolymer in the substantial absence of oxygen of 2 to 98% by weight of poly(2-ethylhexyl methacrylate) and 98 to 2% by weight of butyl vinyl sulfide, which comprises graft copolymerizing said poly(2-ethylhexyl methacrylate) and said butyl vinyl sulfide by exposure to 10,000 to 10,000,000 reps of high-energy ionizing radiation at a temperature range of 0° to 70° C., in which said polymethacrylate has a molecular weight of 1,000 to 5,000,000 and the monomer forms a side chain graft having a molecular weight of 1,000 to 1,000,000.

12. A method for the preparation of a graft copolymer in the substantial absence of oxygen of 2 to 98% by weight of poly(decyl methacrylate) and 98 to 2% by weight of acrylic acid, which comprises graft copolymerizing said poly(decyl methacrylate) and said acrylic acid by exposure to 10,000 to 10,000,000 reps of high-energy ionizing radiation at a temperature range of 0° to 70° C., in which said polymethacrylate has a molecular weight of 1,000 to 5,000,000 and the monomer forms a side chain graft having a molecular weight of 1,000 to 1,000,000.

References Cited in the file of this patent

UNITED STATES PATENTS

| | | |
|---|---|---|
| 1,906,402 | Newton | May 2, 1933 |
| 2,830,943 | Mackenzie | Apr. 15, 1958 |
| 2,837,496 | Vandenberg | June 3, 1958 |
| 2,841,569 | Rugg et al. | July 1, 1958 |
| 2,926,126 | Graham et al. | Feb. 23, 1960 |

FOREIGN PATENTS

| | | |
|---|---|---|
| 1,130,099 | France | Sept. 17, 1956 |
| 1,130,100 | France | Sept. 17, 1956 |
| 764,297 | Great Britain | Dec. 28, 1956 |

OTHER REFERENCES

"Journal Polymer Science," pages 219–224, January 1956.

Pinner et al.: "Plastics," pages 27–30, January 1958.

Billmeyer: Textbook of Polymer Chemistry, pages 239–240, published by Interscience Publishers, New York, 1957.